| (12) | United States Patent | (10) Patent No.: | US 10,683,425 B2 |
|---|---|---|---|
| | Ward et al. | (45) Date of Patent: | *Jun. 16, 2020 |

(54) PRINTING INK

(71) Applicant: FujiFilm Speciality Ink Systems Limited, Broadstairs Kent (GB)

(72) Inventors: Jeremy Ward, Broadstairs Kent (GB); Lee Corfe, Broadstairs Kent (GB)

(73) Assignee: FujiFilm Speciality Ink Systems Limited, Broadstairs Kent (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/520,358

(22) PCT Filed: Oct. 20, 2015

(86) PCT No.: PCT/GB2015/053118
§ 371 (c)(1),
(2) Date: Apr. 19, 2017

(87) PCT Pub. No.: WO2016/063030
PCT Pub. Date: Apr. 28, 2016

(65) Prior Publication Data
US 2017/0313894 A1 Nov. 2, 2017

(30) Foreign Application Priority Data

Oct. 20, 2014 (GB) .................................. 1418616.7

(51) Int. Cl.
| | | |
|---|---|---|
| *B41J 11/00* | (2006.01) | |
| *C09D 11/101* | (2014.01) | |
| *C09D 11/107* | (2014.01) | |
| *C09D 11/322* | (2014.01) | |
| *C09D 11/40* | (2014.01) | |

(52) U.S. Cl.
CPC ......... *C09D 11/101* (2013.01); *B41J 11/0015* (2013.01); *C09D 11/107* (2013.01); *C09D 11/322* (2013.01); *C09D 11/40* (2013.01)

(58) Field of Classification Search
CPC ... C09D 11/101; C09D 11/107; C09D 11/322; C09D 11/40; B41J 11/0015
See application file for complete search history.

(56) References Cited

U.S. PATENT DOCUMENTS

| 2007/0206053 A1* | 9/2007 | Kasai ................... B41C 1/1066 |
| | | 347/52 |
| 2012/0026235 A1 | 2/2012 | Hayata |
| 2017/0321074 A1* | 11/2017 | Ward ................... C09D 11/101 |

FOREIGN PATENT DOCUMENTS

| EP | 2 402 405 A1 | 1/2012 |
| EP | 2 412 768 A2 | 2/2012 |
| WO | 2014/030015 A1 | 2/2014 |

OTHER PUBLICATIONS

International Search Report for corresponding application No. PCT/GB2015/053118 dated Feb. 1, 2016.

* cited by examiner

*Primary Examiner* — Patrick D Niland
(74) *Attorney, Agent, or Firm* — Wood, Phillips, Katz, Clark & Mortimer

(57) ABSTRACT

The present invention provides an inkjet ink comprising: 6-35% by weight of NVC; 5-60% by weight of PEA; 15-35% by weight of a C8.12 alkane diol di(meth)acrylate; a radical photoinitiator; and a colorant, wherein the percentages by weight are based on the total weight of the ink. The present invention further provides an inkjet ink set wherein at least one of the inks in the set, preferably all of the inks in the set, is an inkjet ink as defined above. Furthermore, the present invention provides a method of inkjet printing comprising inkjet printing the inkjet ink or inkjet ink set as defined above onto a substrate and curing the ink.

14 Claims, No Drawings

PRINTING INK

FIELD OF THE INVENTION

The present invention relates to a printing ink, and in particular to an inkjet ink that provides a good balance of adhesion with blocking resistance and low embrittlement.

BACKGROUND OF THE INVENTION

In inkjet printing, minute droplets of black, white or coloured ink are ejected in a controlled manner from one or more reservoirs or printing heads through narrow nozzles on to a substrate which is moving relative to the reservoirs. The ejected ink forms an image on the substrate. The resulting image should be as high quality as possible.

Inks which cure by the polymerisation of monomers may contain a wide variety of monofunctional, difunctional and multifunctional monomers. The challenge is to provide the necessary printing properties, whilst providing a high-quality image, without compromising the jetting properties. This is made all the harder in inks which are formulated without the use of water or volatile organic solvents (which also have their own disadvantages).

Inks based on monofunctional (meth)acrylate monomers tend to have excellent adhesion and low shrinkage, but generally have poor resistance properties (blocking, solvent resistance, etc). Also purely monofunctional (meth)acrylate monomer-based inks (and particularly those containing NVC), despite giving films with high elongation, suffer from poor embrittlement of the substrate. To boost the resistance properties it is necessary to include difunctional or multifunctional (meth)acrylate monomers to impart a degree of cross linking, but the addition of such components tends to lead to reduced adhesion.

There is therefore a need in the art for an inkjet ink that has the correct balance of adhesion, blocking resistance and low embrittlement.

BRIEF SUMMARY OF THE INVENTION

Accordingly, the present invention provides an inkjet ink comprising: an N-vinyl amide and/or N-acryloyl amine monomer; at least two cyclic monofunctional (meth)acrylate monomers; a difunctional (meth)acrylate monomer; a radical photoinitiator; and a colorant, wherein one of the cyclic monofunctional (meth)acrylate monomers is PEA, and wherein the difunctional (meth)acrylate monomer is a $C_{8-12}$ alkane diol di(meth)acrylate.

The inventors have surprisingly found that an inkjet ink that comprises the specific blend of components, in particular the specific difunctional (meth)acrylate monomer, provides the necessary balance of properties.

DETAILED DESCRIPTION OF THE INVENTION

The inkjet ink of the present invention comprises an N-vinyl amide and/or N-(meth)acryloyl amine monomer.

N-Vinyl amides are well-known monomers in the art. N-Vinyl amides have a vinyl group attached to the nitrogen atom of an amide which may be further substituted in an analogous manner to the (meth)acrylate monomers. Preferred examples are N-vinyl caprolactam (NVC) and N-vinyl pyrrolidone (NVP). Similarly, N-acryloyl amines are also well-known in the art. N-Acryloyl amines also have a vinyl group attached to an amide but via the carbonyl carbon atom and again may be further substituted in an analogous manner to the (meth)acrylate monomers. A preferred example is N-acryloylmorpholine (ACMO). The most preferred monomer is NVC.

Preferably, the inkjet ink comprises 6-35% by weight, more preferably 8-25% by weight and most preferably 10-20% by weight, of an N-vinyl amide and/or N-(meth)acryloyl amine monomer, based on the total weight of the ink.

The inkjet ink of the present invention comprises at least two cyclic monofunctional (meth)acrylate monomers, one of which is PEA.

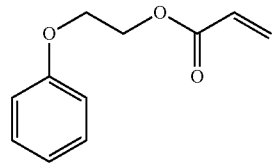

Phenoxyethyl acrylate (PEA), mol wt 192 g/mol

Monofunctional (meth)acrylate monomers are well known in the art and are preferably the esters of acrylic acid.

Monomers typically have a molecular weight of less than 600, preferably more than 200 and less than 450. They typically have a viscosity of less than 2 mPas at 25° C. Monomer viscosities can be measured using an ARG2 rheometer manufactured by T.A. Instruments, which uses a 40 mm oblique/2° steel cone at 60° C. with a shear rate of $25\ s^{-1}$.

The ink contains a first and second cyclic monofunctional (meth)acrylate monomer. The first cyclic monofunctional (meth)acrylate monomer is PEA. The substituents of the second cyclic monofunctional (meth)acrylate monomer are not limited other than by the constraints imposed by the use in an ink-jet ink, such as viscosity, stability, toxicity, etc.

The substituents of the second cyclic monofunctional (meth)acrylate monomer are typically cycloalkyl, aryl and combinations thereof, any of which may be interrupted by heteroatoms and/or substituted by alkyl. Non-limiting examples of substituents commonly used in the art include $C_{3-15}$ cycloalkyl, $C_{6-10}$ aryl and combinations thereof, any of which may substituted with alkyl (such as $C_{1-18}$ alkyl) and/or any of which may be interrupted by 1-10 heteroatoms, such as oxygen or nitrogen, with nitrogen further substituted by any of the above described substituents. The substituents may together also form a cyclic structure.

Preferably, the second cyclic monofunctional (meth)acrylate monomer is selected from cyclic TMP formal acrylate (CTFA), isobornyl acrylate (IBOA), tetrahydrofurfuryl acrylate (THFA) and mixtures thereof. The preferred examples of cyclic monofunctional (meth)acrylate monomers have the following chemical structures:

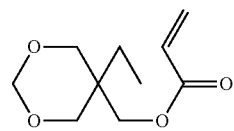

Cyclic TMP formal acrylate (CTFA), mol wt 200 g/mol

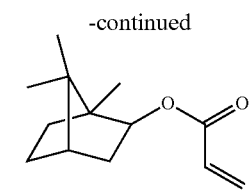

Isobornyl acrylate (IBOA)
mol wt 208 g/mol

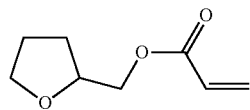

Tetrahydrofurfuryl acrylate (THFA)
mol wt 156 g/mol

Mixtures of (meth)acrylates may be used.

The most preferred is IBOA. In a particularly preferred embodiment, the only cyclic monofunctional (meth)acrylate monomers present in the ink are PEA and IBOA. In a further preferred embodiment, the ink contains no other monofunctional (meth)acrylate monomers, i.e. it is substantially free of acyclic-hydrocarbon monofunctional (meth)acrylate monomers.

Examples of acyclic-hydrocarbon monofunctional (meth)acrylate monomers to be avoided are:

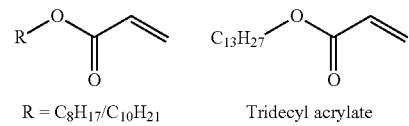

R = $C_8H_{17}/C_{10}H_{21}$
Octadecyl acrylate (ODA)
mol wt 200 g/mol

Tridecyl acrylate
(TDA) mol 254 g/mol

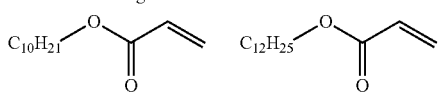

Isodecyl acrylate (IDA)
mol wt 212 g/mol

Lauryl acrylate
mol wt 240 g/mol

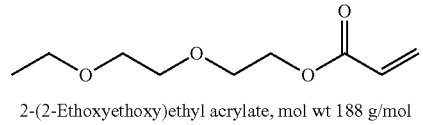

2-(2-Ethoxyethoxy)ethyl acrylate, mol wt 188 g/mol

Preferably, the ink comprises 10-70% by weight, preferably 25-60% by weight of cyclic monofunctional (meth)acrylate monomers, based on the total weight of the ink. The ratio by weight of PEA to the other cyclic monofunctional (meth)acrylate monomer(s) is preferably 1-10:1, more preferably 2-5:1.

A particularly preferred ink contains NVC, PEA and IBOA, more preferably these are the only monofunctional monomers present in the ink, and most preferably they are they are the only monomers present in the ink other than the $C_{8-12}$ alkane diol di(meth)acrylate.

The inkjet ink of the invention further comprises a difunctional (meth)acrylate monomer, which is a $C_{8-12}$ alkane diol di(meth)acrylate. It is a linear or branched, preferably linear, alkylene moiety having 8-12 carbon atoms with two primary hydroxyl groups at either end of the alkylene chain which are ester functionalised with (meth)acrylic acid groups. It is preferably a diacrylate, i.e. a $C_{8-12}$ alkane diol diacrylate.

Low levels of other difunctional monomers (including (meth)acrylate monomers) can be tolerated, but preferably the ink contains no more than 10% by weight, more preferably no more than 5%, of difunctional monomers other than the $C_{8-12}$ alkane diol di(meth)acrylate, based on the total weight of the ink. The $C_{8-12}$ alkane diol di(meth)acrylate is preferably the sole difunctional monomer present in the ink.

Examples of the $C_{8-12}$ alkane diol di(meth)acrylate are 1,8-octanediol diacrylate, 1,9-nonanediol diacrylate, 1,10-decanediol diacrylate, 1,11-undecanediol diacrylate and 1,12-dodecanediol diacrylate. A preferred $C_{8-12}$ alkane diol di(meth)acrylate is 1,10-decanediol diacrylate (DDDA).

Preferably, the ink comprises 8-25% by weight of $C_{8-12}$ alkane diol di(meth)acrylate, based on the total weight of the ink.

The ink of the present invention can also tolerate low levels of multifunctional monomers (including multifunctional (meth)acrylate monomers), i.e. no more than 5% by weight, more preferably no more than 2%, based on the total weight of the ink. The ink is preferably substantially free of multifunctional monomers (including multifunctional (meth)acrylate monomers).

The substituents of the multifunctional and other difunctional monomers are not limited other than by the constraints imposed by the use in an ink-jet ink, such as viscosity, stability, toxicity, etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. The substituents may together also form a cyclic structure.

Examples of multifunctional (meth)acrylate monomers (which do not include difunctional (meth)acrylate monomers) include tri-, tetra-, penta-, hexa-, hepta- and octa-functional monomers. Examples of the multifunctional acrylate monomers that may be included in the inkjet inks include trimethylolpropane triacrylate, pentaerythritol triacrylate, tri(propylene glycol) triacrylate, bis(pentaerythritol) hexaacrylate, and the acrylate esters of ethoxylated or propoxylated glycols and polyols, for example, ethoxylated trimethylolpropane triacrylate, and mixtures thereof. Suitable multifunctional (meth)acrylate monomers also include esters of methacrylic acid (i.e. methacrylates), such as trimethylolpropane trimethacrylate.

Examples of difunctional (meth)acrylate monomers include hexanediol diacrylate (HDDA), polyethyleneglycol diacrylate (for example tetraethyleneglycol diacrylate), dipropyleneglycol diacrylate, neopentylglycol diacrylate, 3-methyl pentanediol diacrylate, and the acrylate esters of ethoxylated or propoxylated glycols and polyols, for example, propoxylated neopentyl glycol diacrylate, and mixtures thereof; and hexanediol dimethacrylate, triethyleneglycol dimethacrylate, diethyleneglycol dimethacrylate, ethyleneglycol dimethacrylate, 1,4-butanediol dimethacrylate and mixtures thereof.

In a particularly preferred embodiment, $C_{8-12}$ alkane diol di(meth)acrylate is the sole di- or higher-functionality monomer present in the ink.

(Meth)acrylate is intended herein to have its standard meaning, i.e. acrylate and/or methacrylate. Mono and difunctional are intended to have their standard meanings, i.e. one or two groups, respectively, which take part in the polymerisation reaction on curing. Multifunctional (which does not include difunctional) is intended to have its standard meanings, i.e. three or more groups, respectively, which take part in the polymerisation reaction on curing.

The ink of the present invention comprises a radical photoinitiator. The free-radical photoinitiator can be selected from any of those known in the art. For example, benzophenone, 1-hydroxycyclohexyl phenyl ketone, 1-[4-(2-hydroxyethoxy)-phenyl]-2-hydroxy-2-methyl-1-propane-1-one, 2-benzyl-2-dimethylamino-(4-morpholinophenyl) butan-1-one, isopropyl thioxanthone, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure and Darocur (from Ciba) and Lucerin (from BASF). Preferred photoinitiators are selected from bis(2,6-dimethylbenzoyl)-2,4,4-trimethylpentylphosphine oxide, 1-hydroxycyclohexyl phenyl ketone and mixtures thereof.

Preferably, the photoinitiator is present in an amount of 1-20% by weight, preferably 2-15% by weight, based on the total weight of the ink.

Mixtures of free radical photoinitiators can be used and preferably, the ink comprises a plurality of free radical photoinitiators. The total number of free radical photoinitiators present is preferably from one to five, and more preferably, two or more free radical photoinitiators are present in the ink.

The surface tension of the ink is preferably in the range of 20-40 mNm$^{-1}$ and more preferably 21-32 mNm$^{-1}$.

The inks of the present invention preferably also contain a radiation-curable (i.e. polymerisable) oligomer or a passive resin.

The term "curable oligomer" has its standard meaning in the art, namely that the component is partially reacted to form a pre-polymer having a plurality of repeating monomer units, which is capable of further polymerisation. The oligomer usually has a molecular weight of at least 450 and preferably at least 600. The molecular weight is typically 4,000 or less. Molecular weights (number average) can be calculated if the structure of the oligomer is known or molecular weights can be measured using gel permeation chromatography using polystyrene standards.

The degree of functionality of the oligomer determines the degree of crosslinking and hence the properties of the cured ink. The oligomer is preferably multifunctional meaning that it contains on average more than one reactive functional group per molecule. The average degree of functionality is preferably from 2 to 6.

Preferred oligomers for inclusion in the ink of the invention have a viscosity of 0.5 to 10 Pas at 50° C. Oligomer viscosities can be measured using an ARG2 rheometer manufactured by T.A. Instruments, which uses a 40 mm oblique/2° steel cone at 60° C. with a shear rate of 25 s$^{-1}$.

Radiation-curable oligomers comprise a backbone, for example a polyester, urethane, epoxy or polyether backbone, and one or more radiation-curable groups. The oligomer preferably comprises a polyester backbone. The polymerisable group can be any group that is capable of polymerising upon exposure to radiation. Preferably the oligomers are (meth)acrylate oligomers, e.g. polyester acrylate oligomers.

Other suitable examples of radiation-curable oligomers include epoxy based materials such as bisphenol A epoxy acrylates and epoxy novolac acrylates, which have fast cure speeds and provide cured films with good solvent resistance.

In one embodiment the radiation-curable oligomer polymerises by free-radical polymerisation. Preferably, the radiation-curable oligomer cures upon exposure to radiation in the presence of a photoinitiator to form a crosslinked, solid film.

Passive (or "inert") resins are resins which do not enter into the curing process, i.e. the resin is free of functional groups which polymerise under the curing conditions to which the ink is exposed. In other words, resin is not a radiation-curable material. The resin may be selected from epoxy, polyester, vinyl, ketone, nitrocellulose, phenoxy or acrylate resins, or a mixture thereof and is preferably a poly(methyl (meth)acrylate) resin. The resin has a weight-average molecular weight of 70-200 KDa and preferably 100-150 KDa, as determined by GPC with polystyrene standards.

The total amount of the oligomer and/or passive resin is preferably from 1-15 wt %, more preferably 2-10 wt %, based on the total weight of the ink.

The inkjet ink of the present invention dries primarily by curing, i.e. by the polymerisation of the monomers present, as discussed hereinabove, and hence is a curable ink. The ink does not, therefore, require the presence of water or a volatile organic solvent to effect drying of the ink. The absence of water and volatile organic solvents means that the ink does not need to be dried to remove the water/solvent. However, water and volatile organic solvents have a significant viscosity-lowering effect making formulation of the ink in the absence of such components significantly more challenging.

Accordingly, the inkjet ink of the present invention is preferably substantially free of water and volatile organic solvents. Preferably, the inkjet ink of the present invention comprises less than 5 wt % of water and volatile organic solvent combined, preferably less than 3% by weight combined, more preferably, less than 2% by weight combined and most preferably less than 1% by weight combined, based on the total weight of the ink. Some water will typically be absorbed by the ink from the air and solvents may be present as impurities in the components of the inks, but such low levels are tolerated.

The ink of the present invention also comprises a colouring agent. The colouring agent may be either dissolved or dispersed in the liquid medium of the ink. Preferably the colouring agent is a dispersible pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 μm, preferably less than 5 μm, more preferably less than 1 μm and particularly preferably less than 0.5 μm.

The colorant is preferably present in an amount of 0.2-20% by weight, preferably 0.5-10% by weight, based on the total weight of the ink. A higher concentration of pigment may be required for white inks, for example up to and including 30% by weight, or 25% by weight, based on the total weight of the ink The amounts by weight provided herein are based on the total weight of the ink.

The inkjet ink exhibits a desirable low viscosity (200 mPas or less, preferably 100 mPas or less, more preferably 50 mPas or less at 25° C.).

In order to produce a high quality printed image a small jetted drop size is desirable, particularly for high resolution images. Preferably the inkjet ink of the invention is jetted at drop sizes below 50 picolitres, preferably below 30 picolitres and most preferably below 20 picolitres.

Ink viscosity may be measured using a Brookfield viscometer fitted with a thermostatically controlled cup and spindle arrangement, such as a DV1 low-viscosity viscometer running at 20 rpm at 25° C. with spindle 00.

Other components of types known in the art may be present in the ink to improve the properties or performance. These components may be, for example, additional surfactants, defoamers, dispersants, stabilisers against deterioration by heat or light, reodorants, flow or slip aids, biocides and identifying tracers.

Print heads account for a significant portion of the cost of an entry level printer and it is therefore desirable to keep the number of print heads (and therefore the number of inks in the ink set) low. Reducing the number of print heads can reduce print quality and productivity. It is therefore desirable to balance the number of print heads in order to minimise cost without compromising print quality and productivity.

The inkjet ink set of the invention has at least one ink that falls within the scope of the inkjet ink according to the present invention. Preferably, all of the inks in the set fall within the scope of the inkjet ink according to the present invention.

Usually, the inkjet ink set of the present invention is in the form of a multi-chromatic inkjet ink set, which typically comprises a cyan ink, a magenta ink, a yellow ink and a black ink (a so-called trichromatic set). This set is often termed CMYK. The inks in a trichromatic set can be used to produce a wide range of colours and tones.

The ink or inkjet ink sets may be prepared by known methods such as stirring with a high-speed water-cooled stirrer, or milling on a horizontal bead-mill.

The present invention also provides a method of inkjet printing using the above-described ink or ink set and a substrate having the ink or ink set cured thereon. Accordingly, the present invention further provides a method of inkjet printing comprising inkjet printing the inkjet ink or inkjet ink set as defined herein onto a substrate and curing the ink. Printing is performed by inkjet printing, e.g. on a single-pass inkjet printer, for example for printing (directly) onto a substrate, on a roll-to-roll printer or a flat-bed printer. The inks or inkjet ink set are exposed to actinic (often UV) radiation to cure the ink. The exposure to actinic radiation may be performed in an inert atmosphere, e.g. using a gas such as nitrogen, in order to assist curing of the ink.

In another preferred embodiment, the inks are printed onto a flexible substrate.

The present invention also provides a cartridge containing the inkjet ink or inkjet ink set as defined herein. It also provides a printed substrate having the ink or inkjet ink set as defined herein printed thereon.

The inks of the present invention may advantageously be printed onto low surface energy substrates, by which is meant substrates having a surface energy of 25-50 mN/m (25-50 dyne/cm). Examples of substrates include those composed of polycarbonate, polyethylene terephthalate (PET), PMMA, PVC, polystyrene, polyethylene and polypropylene.

Any of the sources of actinic radiation discussed herein may be used for the irradiation of the inkjet ink. A suitable dose would be greater than 200 mJ/cm$^2$, more preferably at least 300 mJ/cm$^2$ and most preferably at least 500 mJ/cm$^2$. The upper limit is less relevant and will be limited only by the commercial factor that more powerful radiation sources increase cost. A typical upper limit would be 5 J/cm$^2$. Further details of the printing and curing process are provided in WO 2012/110815.

Upon exposure to a radiation source, the ink cures to form a relatively thin polymerised film. The ink of the present invention typically produces a printed film having a thickness of 1 to 20 μm, preferably 1 to 10 μm, for example 2 to 5 μm. Film thicknesses can be measured using a confocal laser scanning microscope.

The invention will now be described with reference to the following examples, which are not intended to be limiting.

EXAMPLES

Example 1

Inkjet inks were prepared according to the formulations set out in Table 1. The inkjet ink formulations were prepared by mixing the components in the given amounts. Amounts are given as weight percentages based on the total weight of the ink.

TABLE 1

| Component | Ink 1 (comparative) | Ink 2 (invention) | Ink 3 (comparative) |
| --- | --- | --- | --- |
| NVC (monofunctional monomer) | 16.5 | 16.5 | — |
| PEA (monofunctional monomer) | 32.05 | 24.68 | — |
| CTFA (monofunctional monomer) | 17.63 | — | — |
| IBOA (monofunctional monomer) | 11.9 | 11.9 | — |
| DDDA (difunctional monomer) | — | 20 | — |
| DPGDA (difunctional monomer) | — | — | 30.7 |
| HDDA (difunctional monomer) | — | — | 30.23 |
| DVE-3 (difunctional monomer) | — | — | 9.41 |
| Ebecryl 230 (oligomer) | — | — | 2.5 |
| Craynor CN964A85 (oligomer) | — | 5.0 | 9 |
| UV12 (stabiliser) | 0.5 | 0.5 | 0.8 |
| SM834 (pigment dispersion) | 6 | 6 | 4.53 |
| Photoinitiator package | 14.42 | 14.42 | 12.71 |
| BYK307 (surfactant) | 1 | 1 | 0.1 |
| Total | 100 | 100 | 100 |

Craynor CN964A85 is an aliphatic polyester-based urethane diacrylate oligomer. SM834 is a cyan pigment dispersion containing 10%. Solsperse 32000, 1% Florstab, 59% Sartomer 339Y (PEA) and 30% heliogen blue D 7110 F (total 100%).

The photoinitiator package contains 0.85% EDB, 0.8% ITX, 2.88% BP, 1.88% Irgacure 184 and 8.01% TPO (total 14.42%).

Inks were printed and cured onto 220 micron PVC using an Acuity 350 Inkjet printer. They were tested for adhesion, blocking and embrittlement. Cross hatch tape adhesion was tested according to BS EN ISO 2409. Embrittlement was tested by rolling an A5 block print (print side out) and striking on a hard surface (bench top) and assessing the damage to the print/substrate (number of cracks propagating from tip of print). Blocking was tested by placing a stack of the prints, both face-to-face and face-to-back under a 20 Kg weight for 24 hours and then checking the prints for ink offset.

Ink 1 showed excellent adhesion but poor blocking and poor embrittlement. Ink 2 showed excellent adhesion, blocking and embrittlement properties. Ink 3 showed excellent block resistance, poor embrittlement and moderate adhesion.

What is claimed is:

1. An inkjet ink comprising: an N-vinyl amide and/or N-acryloyl amine monomer; at least two cyclic monofunctional (meth)acrylate monomers; a difunctional (meth)acrylate monomer; a radical photoinitiator; and a colorant, wherein one of the cyclic monofunctional (meth)acrylate monomers is phenoxyethyl acrylate (PEA), and wherein the difunctional (meth)acrylate monomer is 1,10-decanediol diacrylate (DDDA), and wherein the ratio by weight of PEA to the other cyclic monofunctional (meth)acrylate monomer(s) is 2-5:1.

2. An inkjet ink as claimed in claim 1, wherein DDDA is the sole difunctional monomer present in the ink.

3. An inkjet ink as claimed in claim 1, wherein the ink is substantially free of multifunctional monomers.

4. An inkjet ink as claimed in claim 1, wherein the ink contains 8-25% by weight of DDDA, based on the total weight of the ink.

5. An inkjet ink as claimed in claim 1, wherein the N-vinyl amide and/or N-acryloyl amine monomer is N-vinyl caprolactam (NVC).

6. An inkjet ink as claimed in claim 1, wherein one of the cyclic monofunctional (meth)acrylate monomer is isobornyl acrylate (IBOA).

7. An inkjet ink as claimed in claim 1, wherein the only cyclic monofunctional (meth)acrylate monomers present in the ink are phenoxyethyl acrylate (PEA) and isobornyl acrylate (IBOA).

8. An inkjet ink as claimed in claim 1, wherein the colorant is a dispersed pigment.

9. An inkjet ink as claimed in claim 1, wherein the ink is substantially free of water and volatile organic solvents.

10. An inkjet ink set wherein at least one of the inks in the set is an inkjet ink as claimed in claim 1.

11. A cartridge containing the inkjet ink or the inkjet ink set as claimed in claim 1.

12. A printed substrate having the ink or the inkjet ink set as claimed in claim 1 printed thereon.

13. A method of inkjet printing comprising inkjet printing the inkjet ink or inkjet ink set as claimed in claim 1 onto a substrate and curing the ink.

14. A method as claimed in claim 13, wherein the substrate has a surface energy of 25-50 mN/m.

* * * * *